(12) United States Patent
Groth et al.

(10) Patent No.: US 9,659,365 B2
(45) Date of Patent: May 23, 2017

(54) IMAGE ANALYSING (75) Inventors: Alexandra Groth, Hamburg (DE); Qi Sun, Aachen (DE); Matthias Bertram, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 672 days.

(21) Appl. No.: 13/640,574

(22) PCT Filed: Apr. 5, 2011

(86) PCT No.: PCT/IB2011/051447
§ 371 (c)(1),
(2), (4) Date: Oct. 11, 2012

(87) PCT Pub. No.: WO2011/128806
PCT Pub. Date: Oct. 20, 2011

(65) Prior Publication Data
US 2013/0028494 A1 Jan. 31, 2013

(30) Foreign Application Priority Data
Apr. 13, 2010 (EP) .................................... 10159716

(51) Int. Cl.
G06K 9/00 (2006.01)
G06T 7/00 (2017.01)

(52) U.S. Cl.
CPC .. *G06T 7/0012* (2013.01); *G06T 2207/10072* (2013.01); *G06T 2207/10116* (2013.01); *G06T 2207/20108* (2013.01); *G06T 2207/30104* (2013.01)

(58) Field of Classification Search
None
See application file for complete search history.

(56) References Cited

U.S. PATENT DOCUMENTS

| | | | |
|---|---|---|---|
| 2005/0048456 A1* | 3/2005 | Chefd'hotel | G06T 7/0028 434/267 |
| 2006/0215896 A1* | 9/2006 | Sirohey | G06T 7/0012 382/131 |
| 2007/0019846 A1* | 1/2007 | Bullitt et al. | 382/128 |
| 2008/0240527 A1* | 10/2008 | Keller | G06F 17/30259 382/128 |
| 2008/0294038 A1* | 11/2008 | Weese | A61B 6/481 600/431 |
| 2009/0136100 A1* | 5/2009 | Shinohara | A61B 3/12 382/128 |

(Continued)

FOREIGN PATENT DOCUMENTS

| | | | |
|---|---|---|---|
| NL | WO 2007066249 A2 * | 6/2007 | ............. A61B 6/481 |
| WO | WO2007066249 | 6/2007 | |
| WO | WO 2007066249 A2 * | 6/2007 | |

OTHER PUBLICATIONS

Sun et al ("Quantitative Evaluation of Virtual Angiography for Interventional X-ray Acquisitions", 2009).*

(Continued)

*Primary Examiner* — Avinash Yentrapati (57) ABSTRACT

A flow pattern in a tube system is calculated from acquired image data. From the flow pattern virtual image data are generated and compared with the acquired data in order to determine a quality measure for the usability of the generated flow pattern at characteristic locations.

34 Claims, 3 Drawing Sheets

(56) References Cited

U.S. PATENT DOCUMENTS

| | | | |
|---|---|---|---|
| 2009/0226065 A1* | 9/2009 | Chen | G06F 17/30262 382/131 |
| 2011/0085716 A1* | 4/2011 | Chefd'Hotel | G06K 9/6215 382/128 |
| 2011/0282151 A1* | 11/2011 | Trovato | A61B 5/06 600/117 |
| 2012/0070044 A1* | 3/2012 | Avinash | G06K 9/3233 382/128 |
| 2013/0195338 A1* | 8/2013 | Xu | A61B 6/12 382/131 |

OTHER PUBLICATIONS

Robert H.P. McGregor, et al., "A Fast Alternative to Computational Fluid Dynamics for High Quality Imaging of Blood Flow", MICCAI 2009, Part I, LNCS 5761, pp. 1224-131, Springer-Verlag Berlin Heidelberg 2009.

Q. Sun, et al., "Quantitative Elevation of Viral Angiography for Interventional X-Ray Acquisitions", IEEE, ISBI 2009, pp. 895-898.

J.R. Cebral, et al., "Hemodynamics in Normal Cebral Arteries: Qualitative Compasiron of 4D Phase-Contrast Magnetic Resonance and Image-Based Computational Fluid Dynamics", J. Eng. Math (2009), vol. 64, pp. 367-378.

M.D. Ford, et al., "Virtual Angiography for Visualization and Validation of Computational Models of Aneurysm Hemodynamics", IEEE Transactions on Medical Imaging, vol. 24, No. 12, Dec. 2005, pp. 1586-1592.

J.R. Cebral, et al., "Computational Fluid Dynamics Modeling of Intracranial Aneurysms: Qualitative Comparison with Cebral Angiography", Acad. Radiol. 2007, vol. 14, pp. 804-813.

D.A. Steinman, et al., "Image-Based Computational Simulation of Flow Dynamics in a Giant Intracranial Aneurysm", American Society of Neuroradiology, vol. Apr. 2003, vol. 24, pp. 559-566.

N. Arslan, et al., "CFD Modeling of Blood Flow Inside Human left Coronary Artery Bifurcation with Aneurysms", The European medical and Biological Engineering Conference, Nov. 20-25, 2005, Prague, Czech Republic, pp. 1-7.

J. Svensson, et al., "Feasibility of Patient Specific Aortic Blood Flow CDF Simulation", MICCAI 2006, 4190, Springer-Verlag, Berlin Heidelberg, Germany, 2006, pp. 257-263.

J. Durant, et al., "Toward Quantitative Virtual Angiography Evaluation with in Vitro Studies", IEEE, 2008, pp. 632-635.

H. Schmitt, et al., "Aneurysm Hemodynamics Simulation in 3D-RA", Los Angeles, CA, Apr. 2006, pp. 1-63.

Cebral et al, "Qualitative Comparison of Intra-Aneurysmal Flow Structures Determined From Conventional and Virtual Angiograms", Medical Imaging, Proceedings of SPIE, vol. 6511, 2007 pp. 6511E-1-65111E-9.

* cited by examiner

IMAGE ANALYSING

FIELD OF THE INVENTION

The present invention relates to the technical field of image analyzing. In particular the present invention relates to an imaging analyzing apparatus, to a method for analyzing an image to a computer program element for analyzing an image and to a computer readable medium with a respective computer program element.

BACKGROUND OF THE INVENTION

Functional information can be used for analyzing a fluid flow and computational fluid dynamics (CFD) simulations may allow the generation of such functional information. Such flow patterns generated by CFD may be used for analyzing a flow in a tube system. For example a patient's specific blood flow pattern in a pathological vasculature of interest or a flow pattern in a phantom setup can be generated by CFD. Such generated CFD flow patterns may be used to calculate an angiogram.

WO 2007/066249 A2 described analyzing a blood flow in a vascular system from a dynamic diagnostic observation sequence to determine blood flow parameters for further determination of filters, replay speed and finally visualization of the replayed original and filtered sequences. An exemplary set of mathematical flow models covering the important vessel configurations and pathologies of interest is provided to a physician and a manual or automatic selection technique of an appropriate model for a case under consideration is provided. Each model comprises a parameter set that covers a set of specific flow parameters of a vessel topology or pathology.

SUMMARY OF THE INVENTION

It may be an object of the present invention to provide for an efficient use of CFD simulation.

The object of the invention may be achieved by the subject matter of the independent claims, wherein further embodiments may be incorporated in the dependent claims.

It should be noted that the following described aspects of the invention apply also for the method for analyzing an image, the computer program for analyzing an image and the computer readable medium having stored the computer program for analyzing an image.

According to an aspect of the present invention an image analyzing apparatus may be provided which may comprise an input device, a processing device and an output device.

The input device may be adapted for receiving input data in the form of at least one of clinical image data, e.g. of a clinical angiogram data or clinical image data, geometric data and boundary data. The processing device may be adapted for generating flow pattern data from the geometric data and from the boundary data. The processing device may also be adapted for generating virtual image data or virtual angiogram data from the generated flow pattern data.

The processing device may further be adapted for determining a plurality of characteristic locations in the clinical image data and in the virtual image data. According to an aspect substantially the same characteristic locations are determined in the clinical image data and in the virtual image data. The plurality of characteristic locations may be used for comparing the clinical image data and the virtual image data at predefined locations and/or at corresponding locations in the clinical image data and in the virtual image data.

The output device may be adapted for providing a quality measure at each of the plurality of the characteristic locations. This quality measure may indicate the quality of correspondence or the degree of correspondence of the clinical image data and the virtual image data at each of the plurality of characteristic locations. In other words, a quality measure may be provided which measures the degree of matching of the clinical image data and the virtual image data in a time domain and/or in a spatial domain.

The clinical image data or clinical angiogram data may be an angiogram, in particular a digital image or a time sequence of digital images taken from a measurement device, such as an X-ray device, a C-arm angiographic system, a magnetic resonance imaging (MRI) device, an ultra sound device or a computer tomography (CT) device. An X-ray system may comprise an X-ray source and an X-ray detector.

Virtual image data or virtual angiogram data may be an angiogram, in particular a digital image, generated by computational fluid dynamic simulation (CFD) comprising a bolus injection simulation. A virtual angiogram could also be named an artificial angiogram. A CFD simulation may provide as an output 3D data, e.g. a velocity field inside a patients' vasculature. After performing the CFD simulation the generated 3D data can be converted to 2D data in a calculation step to obtain for example a virtual angiogram.

In general angiogram data may be provided as digital subtraction angiography (DSA) data or as pure non-DSA data. DSA data may be the output of a DSA device. A DSA angiogram may be the difference of an image showing a vasculature before the application of an contrast agent and an image showing the vasculature after the application of a contrast agent. The image of the vasculature before the CA application may be used as a subtraction mask.

Providing a quality measure at the plurality of characteristic locations or at least at a single characteristic location may allow the provision of a confidence measure for the result of a CFD simulation and furthermore allow indication of the trustability of the CFD simulation in time as well as in space, i.e. in the time domain and spatial domain, respectively.

The quality measure may allow a user, who is not familiar with interpreting the quality of a virtual angiogram, assessing the quality of the simulation results. Thus, a professional medical expert may not be required.

In addition, the image of a structure, such as a tube system, a vasculature or a silicon phantom, comprising the characteristic locations or at least providing the quality information at the characteristic locations may give feedback to a user about the reliability of the CFD results at a predefined part of the provided data or image. Thus the provided or used quantitative measures may reflect the trustability of the results in the form of the resulting number and/or as a color coded degree of reliability of the predefined part of the image. The quantitative measures may be displayed in at least one display mode selected from the group of display modes consisting of displaying a single quantitative value, displaying a single quantitative value representative for a list of values and displaying a color coded degree of reliability. A user may be able to select a display mode.

This feedback may be given to the user or to the image analyzing apparatus. This feedback may provide an indication of possible error sources for the inaccuracy of the CFD simulation. Thus, in the case of divergence of the clinical image data and the virtual image data, possible error sources for the inaccuracy of the simulation may be indicated to a user. This may also allow for restarting a simulation with amended input conditions in order to provide for a more accurate new simulation result at a predetermined location.

The plurality of characteristic locations may be seen as reference points in the clinical image data as well as in the virtual image data.

According to a further aspect of the present invention a method for analyzing an image may be provided comprising a step of receiving of input data in the form of at least one of clinical image data, geometric data and boundary data. The method may further comprise generating flow pattern data from the geometric data and from the boundary data.

The clinical image data may show a time sequence of diffusion and/or of convection of a contrast agent in a vessel system, whereas the geometric data substantially show an acquired vessel structure, e.g. a 3D (3 dimensional) model. The convection may be an indication of a movement of a flow in a direction substantially parallel to a vessel geometry. Boundary data may provide boundary conditions for the CFD such as injection assumptions or an injection curve.

A virtual image or virtual image data may be generated from the generated flow pattern data and if available from the boundary data. Characteristic locations may be determined in the clinical image data and substantially the same characteristic locations may be identified in the virtual image data. At each of the plurality of the determined characteristic locations a quality measure may be provided. The quality measure may indicate the quality of correspondence or the quality of matching of the clinical image data and the virtual image data at each of the plurality of characteristic locations.

The method may be used for image data analyzing or data analyzing in general.

It may be seen as gist of the invention to generate flow pattern data or a flow pattern by a CFD simulation. This flow pattern data may provide more information for analyzing a fluid flow in a structure, such as blood flow in a vessel structure, than clinical image data or a clinical 2D (2 dimensional) or 3D angiogram alone. A flow pattern may comprise a velocity field and may allow an analysis of a hemodynamic behavior within a vessel system. In particular hemodynamic behavior of pathologies such as aneurysms and/or stenosis may be visualized with flow patterns. A CFD simulation may always generate a result. However, the simulation result may depend on a plurality of criteria. Therefore, the information about the trustability of the simulation result at a predefined location may increase the usability of the simulation result.

From the simulation result the virtual image data or a virtual image may be provided. Thus comparison of the virtual image with a real image, with a clinical angiogram or with clinical angiogram data may be possible. In the case of a good match between the calculated virtual image and the acquired clinical image, an indication may be provided for showing that the simulation result at the corresponding location may have a high degree of trustability. This may allow for a closed loop arrangement, which may change the input data. Simulation results may be determined in a loop until a desired degree of accuracy can be provided at a predefined location.

A flow pattern in a tube system may be calculated from acquired image data. From the flow pattern virtual image data may be generated and the virtual image data may be compared with the acquired data in order to determine a quality measure for the usability of the generated flow pattern at characteristic locations. The quality measure may be a single quantitative value or measure, a group of appropriate values or a color code and thus may make the interpretation of the simulation results easy. In particular the reduction of the result to a quantitative value may allow an interpretation of the results for a person with only limited knowledge about fluid dynamics and interpretation of simulation results.

If a simulation result may provide a high number of locations having a high degree of trustability, the overall trustability of the simulation result may be high.

Thus different scenarios may be possible. In one example at a certain location of an aneurysm a high trustability may be required since a specific aneurysm may have to be investigated. In another case a high overall reliability may be required since a complete structure may have to be investigated end to end.

A set of quality measures appropriate for the identified characteristic locations may be suggested by the imaging apparatus in order to take the burden from the user to select the appropriate quality measures. However, the user may amend the desired quality measure via an adequate input device.

In other words, an automatic, systematic, comprehensive and quantitative CFD validation method maybe described. To this aim, quantitative measures for the correspondence of clinical and virtual angiograms can be defined, e.g. Lp, L2, L∞ norm of cross-sectional, streamline and ROI time intensity curves, steepness of increasing flank, degree of pulsatility, a degree of backflow, temporal distances, vortex axis, rotation speed of vortex, length, angle and speed of inflow jet, contrast agent exchange between compartments, local transfer functions. The character p in the term 'Lp norm' may be selected as a natural number between 1 and ∞. Thus, in an example the L2 norm may be an Lp norm where p is set to 2. The quantitative measures may be determined at characteristic locations, wherein a characteristic location may be automatically identified in the given vessel geometry by a comparison method or a pattern recognition method. The pulsatility may be a measure of a heart rhythm and comprise a variation of flow dependent on the phase of the heart rhythm. The pulsatility may be represented by a variation of a mixing ratio between blood and CA resulting in a variation of absorption. Thus, the pulsatility may be detected as the change of absorption over time when a contrast agent travels through a vessel system.

Characteristic locations may be located behind catheter, at catheter tip, before bifurcation, at the N-outflows, at aneurysms, at stenosis or other pathologies. Thereby, the applied measure may be chosen in dependence on the currently examined location in the vasculature. As a result, the proposed comparison method may provide a confidence measure for the CFD result and indicate the trustable part of the CFD simulation in time and space. In addition, an image of the vasculature comprising the checked locations, the used quantitative measures for comparison, the resulting numbers or values and the color coded degree of reliability for each part of the vasculature may be provided as feedback to the user. A corresponding display mode may be selected. In case of divergences between the clinical angiogram and the virtual angiogram, the proposed method may indicate possible error sources for the inaccuracy of the CFD simulation to the user.

Thus, comparison of both angiograms by a visual inspection may be prevented. Visual inspection may mainly regard the arrival times of the contrast agent (CA) during bolus propagation. Furthermore, comparing both angiograms by substantially only calculating residence time maps for aneurysms may be prevented, e.g. residence time of a CA.

According to an aspect of the present invention a plurality of features of CFD may be examined at the same time and may substantially not limit the comparison to certain single features. Hence, complex flow patterns may be examined.

These and other aspects of the invention may become apparent from and elucidated with reference to the embodiments described hereinafter.

A computer readable medium may be a floppy disc, a hard disc, a USB (Universal Serial Bus) storage device, a RAM (Random Access Memory), a ROM (Read Only Memory) or an EPROM (Erasable Programmable Read Only Memory). A computer readable medium may also be a data communication network, e.g. the Internet, which may allow downloading a program element or program code.

It has also to be noted that aspects of the invention may be described with reference to different subject matters. In particular, some aspects may be described with reference to apparatus type claims whereas other aspects may be described with reference to method type claims. However, persons skilled in the art will gather from the above and the following description that, unless otherwise notified, in addition to any combination between features belonging to one type of subject matter also any combination between features relating to different types of subject matters maybe considered to be disclosed with this text. In particular, combinations between features relating to the apparatus type claims and features relating to the method type claims may be considered to be disclosed.

BRIEF DESCRIPTION OF THE DRAWINGS

Exemplary embodiment of the invention will be described in the following with reference to the following drawings.

DETAILED DESCRIPTION OF EMBODIMENTS

The following examples may be described with reference to angiogram data. This however, may not limit the disclosure to angiogram data. The present invention can be used to handle similar technical problems when analyzing any image data or any time sequence of image data.

Figure 1:
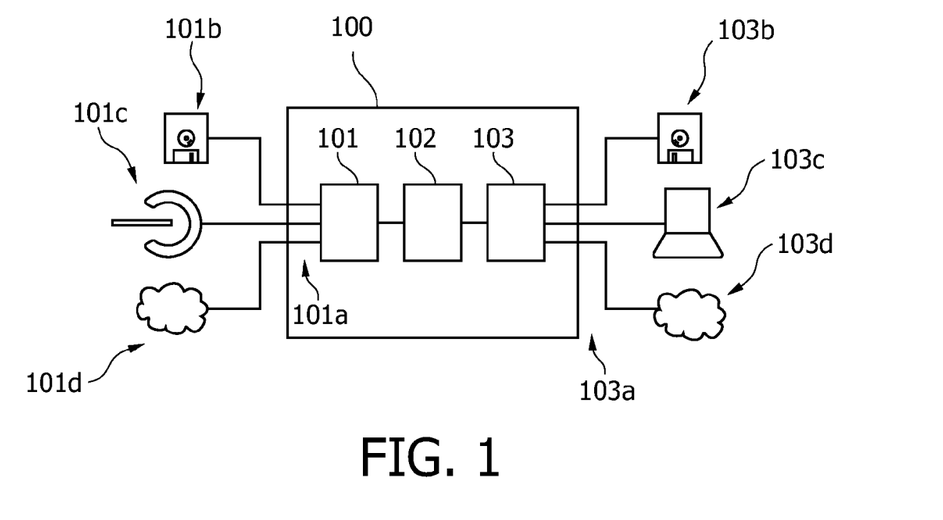
FIG. 1 shows a block diagram of an image analyzing apparatus according to an exemplary embodiment of the present invention.

FIG. 1 shows a block diagram of an image analyzing apparatus 100 according to an exemplary embodiment of the present invention. The imaging analyzing apparatus 100 comprises the input device 101, the processing device 102 and the output device 103. The processing device 102 in an example may control the input device 101 and/or the output device 103. The input device 101 can comprise interfaces 101a. These interfaces 101a are connected to different components 101b, 101c, 101d of the input device, which may deliver the input data for the input device 101. An input device can be a computer readable medium 101b and in particular a write/read device for writing and/or reading digital image data on/from a digital readable medium. Furthermore, via an interface 101a, a medical device 101c can be connected, for example an X-ray system comprising an X-ray detector and an X-ray source, a DSA device, a Doppler device, a pressure wire, a flow meter, an MR device, a CT device, a flow meter, a 3D rotational angiography (RA) device or an injecting device. An input device may also use a communication network 101d or a device connected via a communication network 101d. Via the interface 101a input data is delivered into the imaging apparatus 100.

The CT device, the 3D RA device substantially provide geometric data.

The Doppler device, the pressure wire, the electromagnetic flow meter, the MR device and the injecting device substantially provide boundary data.

The X-ray device, the MR device and the CT device substantially provide clinical image data.

The interfaces 101a can thus be used to provide the input data in form of clinical angiogram data, geometric data, boundary data and/or virtual angiogram data. In another example, if the data is not available in digital form, the interface 101a may be connected to a scanner in order to digitize analog angiogram data and providing a digital scan.

Angiogram data may be a digital image representation of an angiogram in a standard graphic format. In a further example angiogram data may also be a sequence of digital images representing different flow phases of a contrast agent propagation through a tube system, in particular through a vessel system. The input device 101 is connected to the processing device 102 and delivers via this connection the input data to the processing device 102.

The boundary data may comprise information about an injection curve such as an injection rate over time and the characteristics of a catheter, a vessel resistance, an input flow, an output flow, an output flow at a plurality of outlets e.g. N outlets, an input pressure, an output pressure, an input velocity, an output velocity and an upstream vessel pressure and a downstream vessel pressure. The boundary data may be indirectly derived by converting the output of an input device into a boundary condition. For example, an injection curve can be calculated from the average flow of an CA in a case where the injection curve may not be available.

Instead of providing the injection curve as pre-calculated input data, raw output data directly provided from a corresponding injecting device may be provided to the input device 101 and the input device 101 calculates a corresponding injection curve using the raw data. Such a configuration may increase the trustability of a simulation since the actual present values read by the injection device can be provided. These raw data may reflect the specific actual patients conditions. Providing raw data directly may prevent extracting the injection curve from clinical angiogram data or from a patient's cohort.

The input data furthermore can comprise geometrical data representing the geometry of the tube system, e.g. a 3D mesh model or a 3D volume. 3D data may be generated by a mesh extraction. The geometric data may be provided by an interface 101a which differs from the interface 101a via which angiogram data are provided. In a particular example every input data stream can have its own interface 101a.

The processing device 102 is further adapted for generating a flow pattern from received geometric data and/or boundary data.

Flow pattern data may be generated during a CFD (Computational Fluid Dynamics) simulation. CFD simulation is a tool which may be used to obtain functional information in a Cath Lab. A Cath Lab may be a catheterization laboratory which may be an examination room in a hospital or clinic with diagnostic imaging devices used to support the catheterization procedure. An example of functional information which may be generated using CFD simulation can be a 3D (three dimensional) velocity field of a flow, in particular 3D velocity field of a blood flow. Another example of functional information is a wall shear stress over time function.

CFD may use as boundary condition the inlet velocity of a mixed fluid, the inlet contrast agent concentration and/or a pressure on a plurality of outlets. For a validation of the results of a CFD simulation, i.e. for CFD validation, a bolus injection is simulated and an artificial angiogram, a virtual angiogram or virtual angiogram data is created from the CFD result.

For the simulation, the injection settings for the bolus injection are chosen in particular identical to the injection setting which are used to acquire a corresponding clinical angiogram, clinical angiogram data or a real angiogram from a patient's vasculature. If both angiograms, i.e. the virtual angiogram and the clinical angiogram, substantially correspond, this fact may be used as proof of the correctness of the CFD results. In particular a degree of correspondence between the clinical angiogram and the virtual angiogram may be determined in order to provide the quantitative measure or a quality measure for the degree or level of correctness of the simulation results.

Thus a quantitative verification method for a CFD simulation may be provided. Using a simulation may prevent direct contact with the patient. The method or the device may be used for any tube system in particular it can be used for a phantom setup, wherein a phantom may be a silicone representation of a vessel system of a patient. The suggested imaging apparatus or angiogram analyzing apparatus may be used for any imaging input data. The processing and analyzing of the input data may be used offline or in real time. The output of the analyzing apparatus may enable a surgeon to decide on the course of action to be taken. This kind of support leaves the surgeon free in the decision about the treatment to be performed.

From the CFD simulation physiological information can either be directly extracted or derived thereof. The physiological information may be a 3D velocity field of a blood flow or of any other flow or in another example a wall shear stress over the time. Providing such physiological information or quantities may allow a physician or a surgeon to enrich his current set of diagnostic information and to base his treatment decision or outcome control onto it. In other words, executing a CFD simulation may allow the generation of information about hemodymanic effects which may be provided in addition to the information provided by a two dimensional or three dimensional angiogram.

For example, the wall shear stress which may not be conducted from a standard angiogram may provide an indication for the rupture risk of aneurysms. In another example the residence time of a fluid, in particular the residence time of blood in an aneurysm may indicate how likely blood clotting will occur after aneurysm stenting. Wall shear stress and/or residence time of blood may not be examined from a standard 2D angiogram or a 3D angiogram however it could be provided by a CFD simulation.

A CFD simulation can use geometric data as input data to base the simulation on. Geometric data may comprise data relating to the specific geometry of the vasculature of a specific patient. The input data or in particular the geometric data and/or boundary data can also provide a pressure, for example, blood pressure or fluid pressure.

A CFD result or CFD simulation result can depend on the quality of a vessel segmentation or on other geometric data. Vessel segmentation may mean a modeling of a patient's vessel system or tube system. The model of the vessel system or vessel segmentation may comprise a meshing step or a reconstruction of a meshing model. An existing mesh model can be smoothed by using a 3D gaussian smoothing filter. Thus, a 3D model of a vessel of interest may be reconstructed. For this reconstruction step the input device may comprise a reconstruction device. Generating a 3D model of the vessel system may be done during a vessel segmentation step.

A CFD simulation may also be sensitive towards an assumed input flow. In other words, the input flow, e.g. generated by an injecting device, should be modeled accurately. The input flow is modeled for the CFD simulation by selecting parameters for the input flow, such as the input flow rate, the output flow rate, corresponding flow pressure or by providing an injection curve. An injection curve can be a step function or in a more complex case a smooth function taking into account physical parameters of the injection device including the expandability of the catheter. The physical parameters may be considered by using a transfer function specific for a catheter. The selected model of the input flow may influence the accuracy of the CFD simulation.

In an example patient specific geometric data can be provided via one of the input interfaces 101a, in order to increase the accuracy for the quantitative verification of the CFD simulation. Furthermore, taking the input flow from a patient directly and not from a patient cohort may also increase the accuracy of the results. A flow model can be provided as boundary data.

In another example, in order to prevent direct contact with the patient, a patient's specific geometry like the geometry of the patient's vascular system may be used however the input flow may be taken from a patient cohort of the same gender and age.

The quality of a CFD simulation result with regard to the accuracy of representing a real situation may vary. A physician may be able to generate a CFD simulation result but may not be able to assess the quality of the CFD simulation result. However, in order to give feedback regarding the quality of the simulation results, quantities, quantitative measures or quantitative values may be extracted from the CFD simulation or may be derived thereof to give feedback about the reliability of the CFD results. In particular the quality for the usability of the simulation may be provided for at least a part of imaging data or a part of a vessel system. A closed loop system may also use such quantitative measures in order to determine whether other simulations or simulations with other boundary conditions may be required in order to increase the accuracy of the simulation results. Thus a quality measure for the simulation result at a predefined area or part of the vessel system to be investigated may be provided.

In another example a user may use the feedback from the analyzing apparatus in order to vary the input data or input parameters. Thus, a validation of the CFD simulation may be provided. Results of a CFD simulation may be used to generate a virtual angiography or virtual angiogram data. The CFD simulation may use input parameters from a bolus injection to simulate a bolus injection and to generate functional information as a result of the CFD simulation. The result of the CFD simulation can also be used in a processing device 101 for generating virtual angiogram data. In other words, a CFD simulation provides flow pattern data as an output which flow pattern data could be used to generate a virtual or artificial angiogram in order to verify it with a clinical angiogram. The simulated bolus injection use substantially identical injection setting which settings are used to acquire the clinical angiogram from the specific patient's pathology. The selected parameter for simulating the bolus injection should as much as possible match the parameters used for the real bolus injection.

Thus a processing device 102 may have two angiograms available, a virtual and a clinical angiogram and can compare the quality in terms of how these angiograms match with each other. Should both angiograms, the clinical angiogram and the virtual angiogram, substantially correspond the CFD results may be assumed to be substantially correct or to be correct with a certain quantitative degree. The degree of trustability can be provided as a quantitative value or quantitative measure. Such a single value or such an election of appropriate values may make comparing the results easy.

The clinical angiogram data may be provided by one of the interfaces 101a. In an example, the input device 101 may also generate the clinical angiogram by assessing raw data directly delivered by clinical measurement devices 101c, for example, an X-ray system or an X-ray device, a CT (computer tomography) device, a DSA (Digital Subtractive Angiography) device or a MRI (Magnetic Resonance Image) systems.

Providing a quantitative measure for the accuracy or trustability of a comparison of both angiograms may prevent a visual inspection and thus may increase the usability of simulation results for a user. For visual inspection only an arrival time of a contrast agent (CA) during bolus propagation may be checked. For an aneurysm the residence time map may be calculated.

Thus the quantitative measure may prevent a diagnosis on a subjective visual inspection, it may prevent limited usability of a CFD since CFD may only be used for certain features and/or it may allow using CFD results for complex flow patterns.

The output device 103 is adapted for providing a quality measure which indicates the quality of correspondence or the matching of the clinical angiogram data and the virtual angiogram data generated from the CFD simulation results. This quality measure can be provided at a predetermined plurality of characteristic locations. The location may be a position in the geometry of the vasculature. The characteristic location may be set up by a setting device (not shown in FIG. 1) which provides a human-machine interface for the input device 101. The setting of predetermined locations can be made by a user or can automatically be determined by the processing device 102. Since angiogram data may be a time sequence of digital image an angiogram may have a space domain and a time domain. The characteristic location therefore can be a location inside a predetermined location identified by a co-ordinate and/or by a point in time. The generated output of the output device 103 may be provided by an output interface 103a to different representation devices. Different modes of display may be selected. Representation devices may be a computer terminal or a computer screen 103c, a computer readable medium 103b or in a communication network 103d.

Criteria for identifying a position in an angiogram as a characteristic location can be an automatic determination criterium e.g. an automatic pattern recognition criterium. Such a criterium can be stored in a database giving a link between identified patterns and characteristic locations. Such a criterium can be based on a vessel geometry. Criteria for identifying characteristic locations could be finding a pattern or criterium belonging to a location behind a catheter, to a location at a catheter tip, to a location at a pathology, to a location before a bifurcation, to a location at an aneurysm, to a location at a stenosis and to a location of an outflow. Characteristic locations can be a 3D volume in a 3D geometry or a 2D structure in a 2D geometry. A 2D geometry, e.g. a 2D angiogram, can be a projection of a 3D structure to a plane.

In other words, based on geometric data by automatic pattern recognition, typical characteristic locations can be identified in an angiogramm and the quality measures for these locations can be provided. The user can manually set up characteristic locations or amend an automatically detected characteristic location by using an input device connected to the processing device 102 or to the output device 103. The characteristic locations can be detected by the processing device 102 and/or by the output device 103.

Thus, the image analyzing apparatus 100 or angiogram analyzing apparatus 100 and a corresponding method may allow a systematic, automatic and quantitative CFD validation based on virtual angiography. Different quantitative measures for the correspondence of clinical angiogram and the virtual angiogram can be used. In other words, the quantitative measures may be any measure providing the quantitative value or a defined set of values for determining the degree of matching of the clinical angiogram and a virtual angiogram. Such a set up may allow assessing the quality of CFD simulation results by a single representative value or a set of values.

Examples of quantitative measures for the correspondence may be time domain measures such as an L2 norm of cross-sectional time intensity curve (TIC), an L∞ norm of cross-sectional TIC, an L2 norm of streamline TIC, and an L∞ norm of streamline TIC, an L2 norm of region of interest (ROI) TIC, an L∞ norm of ROI TIC, steepness of an increasing flank, degree of pulsatility and a temporal distances. Measuring a temporal distance may comprise verifying that the time sequence of images of the virtual angiogram and the time sequence of images of the clinical angiogram are substantially synchronized. Spatial domain measures or space domain measures can be a vortex axis, rotation speed of vortex, length of inflow jet, angle of inflow jet, speed of inflow jet, contrast agent exchange between compartments, and local transfer functions.

Instead of or in addition to providing only a value or only a quantitative measure, a color coded degree of reliability for each part of the vasculature can be provided.

These quantitative measures can be extracted at each characteristic location. These quantitative measures can be extracted at the characteristic locations automatically defined by the computation method for the given vessel geometry. A characteristic location is at least one location selected from the group of locations consisting of a location behind catheter, location at catheter tip, location behind a bifurcation, location before bifurcation, location at aneurysms, location at stenosis or a location at another pathology. Thus, a set of parameters can be generated for each characteristic location or for each location. Using a characteristic location or a predefined location may reduce the computation load for generating the quantitative measures.

The characteristic locations can be set up by a user using an input device (not shown in FIG. 1) or can be automatically defined by the processing device 102 during comparison of the angiogram data. In other words, the characteristic locations may be defined by the comparison method for a given vessel geometry. Should a certain pattern of a vessel geometry be detected in an angiogram, the processing device can mark this location as a characteristic location. A user may provide as an input parameter the vessel geometry or the part of the vessel geometry which shall be determined as a characteristic location. A list of such characteristic locations for a vessel geometries, in particular a corresponding pattern, may be achieved from a database.

A characteristic vessel geometry, which may determine a characteristic location, can be a location substantially behind a catheter. Behind the catheter may be related to a flow direction of a fluid in which the catheter may be embedded or which may be injected by the catheter.

Another characteristic location is an area at the catheter tip or substantially around the catheter tip. Further examples of characteristic locations can be before a bifurcation, wherein before relates to the flow direction of the fluid, or at an aneurysm, at a stenosis or at any other characteristic pathology wherein the term 'at' means substantially around the corresponding location. The region, which may be allocated to a characteristic location, can depend on the resolution of the angiogram data in which the characteristic locations are identified.

The processing device 102 may be adapted to choose an appropriate measure in dependence on the characteristic location in the vasculature which location currently may be examined. In other words the processing device may be adapted to automatically determine the characteristic location in a vessel geometry corresponding to the angiogram and/or corresponding to the CFD simulation. The characteristic location can be classified using different criteria. Thus a type of the characteristic location may be determined. Dependent on the identified type the processing device 102 may choose the quantitative measure, appropriate to the corresponding characteristic location. If in an example the type of a characteristic location is classified as a location at an aneurysm, a region of interest and in particular a region of interest time intensity curve can be the basis for an appropriate quantitative measure. For a characteristic location identified as lying before a bifurcation the streamline TIC may be the appropriate quantitative measure. A list comprising allocations of identified types of vessel geometries or types of characteristic locations to the appropriate quantitative measure may be provided in a database or in a database device. The processing device can access such a database to inquiry the appropriate measure for an identified type of characteristic location. (Such a database is not shown in FIG. 1). A user however, may either online or offline amend the allocations in a database, in order to prevent a limitation to predefined allocations from characteristic locations to the quantitative measures.

Figure 2:
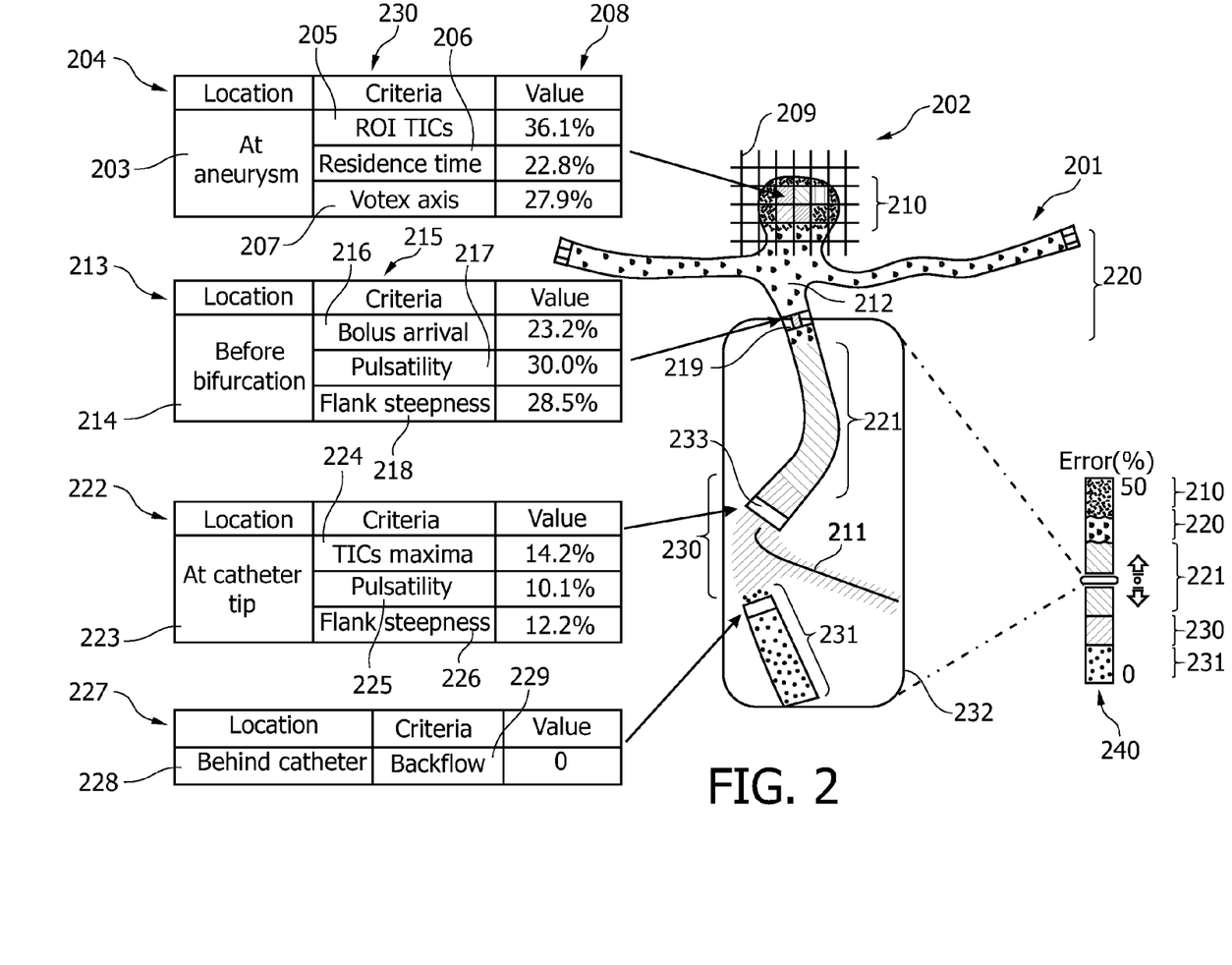
FIG. 2 shows a geometric structure with sets of quantitative measures and a color coded measure according to an exemplary embodiment of the present invention.

FIG. 2 shows a geometric structure with sets of quantitative measures 204, 213, 223, 227 and a color coded measure according to an exemplary embodiment of the present invention. The quality of a simulation result in a corresponding CFD simulation (the result of the CFD simulation is not shown in FIG. 2) is represented as a set or as a list 204, 213, 223, 227 of appropriate quantitative quality measures at a plurality of characteristic locations. The output device 103 can provide such a quality representation via interfaces 103a to different representation devices. The representation device can be a computer readable medium 103b, a computer or a computer screen 103c. The display or representation on the computer screen 103c depicts the comparison result of a virtual angiogram and a clinical angiogram in a quantitative manner. The quantitative representation may also be provided via a communication network 103d to an appropriate device.

FIG. 2 shows a two dimensional representation of a section of the geometry of the vasculature 201, which may be derived from the geometric data. As an alternative representation to the two dimensional representation shown in FIG. 2 a 3D mesh, a segmentation result or a surface in an angiogram or in a DSA may be used. The representation may make the orientation easy. The display of an output from the output device 103 furthermore shows four lists 204, 213, 222, 227 of quantitative values linked to four characteristic locations of the vasculature geometry 201 or of the vessel system 201. Instead of lists a single value may be provided. The lists of quantitative measures are provided in the form of a table 204, 213, 222, 227. The processing device 102 may generate the content of the tables 204, 213, 222, 227 automatically according to predefined criteria or rules. The tables comprise the name of the location, in particular the type of identified characteristic location. Furthermore the table comprise the criteria which are assumed to be the appropriate quantitative measure for the identified type of characteristic location and the corresponding quantitative measure in a percentage value.

An aneurysm 202, which has the form of a balloon is identified as a first characteristic location in the vasculature 201. The vessel geometry of the aneurysm 202 is detected by the processing device 101 and entered as the characteristic location type 'at aneurysm' 203 in the corresponding quantitative measure table 204 to classify the detected characteristic location. The processing device 101 furthermore recognizes that an appropriate quantitative measure for assessing the quality of the CFD simulation results at the aneurysm 202 could be an ROI TIC. Furthermore, the residence time and the vortex axis are identified as additional appropriate quantitative measures, which may interest a user while examining the vessel structure 201. Thus, three quantitative measures ROI TIC 205, residence time 206 and vortex axis 207 are provided for the characteristic location 'at aneurysm'. The single quantitative ROI TIC measure 205 is a representative value of all identified ROI TICs or blocks inside the aneurysm. In the example of FIG. 2 the value 36.1% is a quantitative representation of 6 ROI TICs. In the criteria column 230 or quantitative value column 230 the name of the selected quantitative value and in the value column 208 corresponding accuracy value of the quantitative quality measure are provided.

The processing device 102 recognizes that generating the quality measures at an aneurysm may require the analysis of a region of interest, which is shown in FIG. 2 as shaded blocks of a grid 209 comprising square blocks. Alternatively a ROI could comprise circles or other structures, which match the form of the pathology or of the aneurysm.

The processing device determines the appropriate test, e.g. cross-sectional TIC test, streamline TIC test and ROI TIC test.

For conducting the ROI test appropriate for examining the aneurysm, each angiogram at the location of the aneurysm is divided into substantially the same grid 209. This grid allows comparing corresponding TICs in the clinical angiogram and in the virtual angiogram and determining a single value as measure for the result of that comparison. This comparison may comprise calculating a single value from the comparison of the both angiograms or comprise calculating a single value in each of the angiograms and comparing the single values. E.g. for determining the L2 norm, a difference between the TIC of the clinical angiogram and the TIC of the virtual angiogram is calculated and from this difference a single value or measure is determined. In the case of comparing a vortex axis, the vortex axis is calculated in each of the both angiograms and the difference of both values is provided as the single quantitative value, e.g. the difference angle.

The single quantitative value may indicate a quality measure for how the virtual angiogram matches the clinical angiogram. The quality measure value 208 is converted into an error probability value. The error probability value is mapped to a colour scheme for filling the vessel structure at an appropriate place. The single color code may represent the table of measures at the characteristic location. Calculating the probability value at a plurality of locations inside the vessel geometry 201 in addition to the characteristic locations allows the filling of the vessel structure 201 with a color coded error probability. The filling color at the corresponding characteristic location 210 may depend on the error probability 208 for the provided value of a CFD simulation result e.g. a calculated flow pattern (the CFD result is not shown in FIG. 2). Thus, the trustable part of a CFD simulation in time and space can be identified. In other words, in the example of FIG. 2 the ROI TIC value shows an error probability of 36.1% for a result of CFD simulation at the corresponding characteristic location.

The residence time indicates that the CFD simulation results at the same characteristic location has an error probability of 22.8%, i.e. a trustability of 77.2% (1—error) and the vortex access value at this location provides an error probability of 27.9%.

These error probability values 208 are converted to a single representative value, which is mapped to a color 210 used for an error probability close to 50%. The vessel structure around the aneurysm 202 is filled with this color 210. The display of the error probability may comprise displaying the list of the selected measures and/or displaying a single value representative for the list of selected measures. This representative value for the list may be calculated by weighting the individual values of the list, by calculating an average from the values of the list or by finding a minimum or maximum. Values for locations around or between characteristic locations can be calculated by interpolation.

Another characteristic location in FIG. 2 may be the location before the bifurcation 212. The result for the quantitative measure for the characteristic location 'before bifurcation' again is entered into the appropriate table 213. In the first column of this table 213 the characteristic location 214 'before bifurcation' is provided and in the criteria column 215 the appropriate quantitative measures for the location 'before bifurcation' are provided. In this case the three appropriate values are a bolus arrival 216, pulsatility 217 and the flank steepness 218 which reflect an error probability for a corresponding CFD simulation result of 23.2%, 30.0% and 28.5%, respectively.

The processing device 102 furthermore determines that for examining the characteristic location 'before bifurcation' examining of a streamline TIC 219 would be a good test. The error probability identified for certain locations within the vessel system 201 is mapped to a corresponding color 220 expressing the error probability at the location 'before bifurcation'. The granularity of the color scheme 240 can be predefined and is shown in legend 240.

Another quantitative measure table 222 shown in FIG. 2 is a quantitative measure table at the characteristic position 'at catheter tip' 223. The identified appropriate test is a cross section TIC 233 and the appropriate quantitative measures are the TIC maxima 224, the pulsatility 225 and the flank steepness 226, which in this particular example of FIG. 2 correspond to error probability values of 14.2%, 10.1% and 12.2%, respectively. Color 230 is allocated to this characteristic location probability generated from the 3 probabilities of the set of measures.

A further characteristic location shown in FIG. 2 is represented in the quantitative measure table 227 at a location 'behind catheter' 228. The appropriate criteria or quantitative measure for this position 228 is the backflow 229, which in the particular case of FIG. 2 is determined as an error value 0 assuming that substantially no backflow is considered. Thus a value for the backflow determined by CFD simulation be used as a trustful value when examining the structure 201. The error values are coded in an appropriate color 231 showing errors of about 0%. For the characteristic location behind catheter tip 228 the processing device 102 determines that a cross-sectional TIC is an appropriate test.

In other words, a backflow is assumed to substantially not be present when using a certain simulation model. If however, the clinical angiogram shows a backflow exceeding a certain threshold, the simulation result may be cancelled since the clinical angiogram and the virtual angiogram differ In a case where the backflow can be simulated, the location behind the catheter can be used as a characteristic location.

Using the different error probability values allow the identification of a 'region of reliable CFD' 232. The region of reliable CFD 232 is determined as a region which comprises error values in a range between 0% and 30% or between 10% and 30%.

Thus, as a result of the comparison method a confidence measure, a quality measure, a percentage value or an error value may be provided for the CFD results and a trustable part 232 of the CFD, e.g. a region of reliable CFD 232 can be provided. This trustable part of the CFD 232 may be provided in the time domain and in the space domain. In addition, an image of the vasculature 201 comprising the checked locations 203, 214, 223, 227, the used quantitative measures 205, 206, 207, 216, 217, 218, 224, 225, 226, 229 for the comparison and the resulting numbers, e.g. percentage values, may be provided. The resulting value of reliability could be coded in a color representing the degree of reliability 210, 220, 221, 230, 231, e.g. an error probability, for each part of the image of the vasculature 201. The used granularity of the colour code may depend on the available computing power. The more values are provided, the higher the computational load. The confidence measure, in particular the quantitative measure tables 204, 213, 222, 227 can be provided as a feedback to a user. In case of divergences of clinical angiogram and virtual angiogram, a possible error source for the inaccuracy of the CFD simulation can also be provided as feedback to the user. This indication of a possible error source may allow the execution of a new simulation with different input parameters in order to increase the reliability of a simulation result at a predefined characteristic location.

The feedback may also be used by the processing device 102 or by the output device 103 for generating a further flow pattern if the quality measure does not match a predefined quality measure or range of acceptable quality measures.

In the example of FIG. 2, the error probability for the simulation results may decrease with a gradient in a direction from the aneurysm 202 to the catheter 211. In other words, the reliability increases for the particular example in FIG. 2 in the direction from aneurysm 202 to catheter 211.

In the CFD approach the flow of a liquid, for example a blood flow, over time at an inlet, e.g. an inlet of a catheter, can be used as input data. Further input data can be the liquid flow at N−1 outlets. Flow can be measured in the unit ml/s or cc/s. N is the number of outlets. Further input data can be, if available, the pressure over time at the inlet and at the N outlets (measured in N/m$^2$), the injection rate over time (measured in ml/s or cc/s), the input velocity (measured in m/s) and if available, the upstream vessel resistance and the downstream vessel resistance (measured in Ohm). The input velocity may vary over the vessel cross section. These input data may be regarded as boundary data.

Thus according to an aspect of the invention input data comprises at least one geometric datum selected from the group of geometric data consisting of vasculature geometry, geometric data corresponding to the clinical angiogram data, a 2D model of the vasculature and a 3D mesh model and/or a boundary datum selected from the group of boundary data consisting of an injection rate, an injection rate over time, an input flow, an output flow, a blood flow, a vessel resistance, an input pressure, an output pressure, an input velocity, an output velocity, a velocity over a cross section, an upstream vessel pressure and a downstream vessel pressure.

These input data can be provided via an input interface 101a to the input device 101. These input data either directly as raw data or preprocessed as model data are passed to the processing device 102, which is adapted to execute the CFD simulation. In other words, required input data may be received as raw data or the raw data is used to calculate the required input data. The execution on the processor can be controlled and/or regulated by a program element stored on a computer readable medium. The CFD simulation can use a mixing model for calculating an injection curve and can use a flow model for calculating the overall flow at the inlet. Both models use a set of input data or a set of input values, which may represent a predefined selection of a plurality of input data. Thus, an input device 101 may receive raw input data directly from a component 101b, 101c, 101d of the input device 101. The input device 101 may be adapted for extracting the input data, in particular boundary data, from the components of the input device 101b, 101c, 101d. Substantially without any preprocessing these raw input data may be passed to the processing device 102 directly, which calculates simulation results or flow pattern data based on the raw data. For converting the raw input data into input parameter adequate for generating flow pattern data the processing device may use a mixing model and/or a flow model. The flow model allows calculating the overall flow by summation of a detected blood flow and a weighted CA flow. The mixing model allows calculating a CA concentration by dividing the CA flow by the overall flow. As an alternative to the mixing and/or flow model any other model can be used, which allows converting raw input data into suitable input data for the simulation.

In another example, the input device may only extract a selection of input data as raw data from the input device 101. Missing input data for generating flow patterns are calculated by the processing device 102 from the provided input data and/or the missing input data are based on assumptions such as a cohort data.

In other words, the input device can be adapted for executing at least one preprocessing method selected from the group of preprocessing methods consisting of extracting boundary data from the input device 101, 101a, 101b, 101c, 101d directly, forwarding raw input data to the processing device 102, converting raw input data into adequate input data for the processing device 102, calculating input data for the processing device 102 based on assumptions and for converting raw input data and assumption based input data, i.e. a combination thereof, into adequate input data for the processing device 102. Calculating input data based on assumption may also comprise forwarding assumptions. Thus, substantially all form or combination of input data may be used and the input device may convert the input data such that the input data are adequate for the processing device (102). The processing device 102 may be adapted for generating the flow pattern data from input data provided by the input device 101, 101a, 101b, 101c, 101d and from assumed input data. In another example the processing device 102 may be adapted for generating the flow pattern data from any data provided as a result of the preprocessing method.

The injection curve is a CA concentration over time at the injection point, i.e. a TIC. For calculating the overall flow at the inlet, the CFD simulation can use a flow model. In other words, simulation may comprise calculating an injection curve based on the mixing model and calculating an overall flow at an inlet based on the flow model.

Thus, the injection curve is a calculated curve and particularly not a curve which is extracted from a clinical angiogram. Furthermore, the input flow may also be based on a model or on measured data and substantially not be taken from a patient cohort. An input flow may be calculated by a Doppler device. Calculating the injection curve may prevent conflicting input assumptions or conflicting boundary conditions for the CFD simulation since the injection curve depends on the patient's specific input flow and may substantially not be an independent parameter in general. In other words the injection curve depends on the input data and may prevent taking an input flow from a patient cohort of same gender and age and not from the specific patient to be investigated.

After CFD simulation, i.e. when the CFD simulation results are present, the processing device generates the virtual angiogram for the imaging geometry of the clinical angiogram. The imaging geometry describes the condition of the input device 101, 101b, 101c, 101d under which the clinical angiogram may be generated. The imaging geometry comprises at least one input datum selected from an X-ray setting, a focus, a projection angle, an image section, a current of the tube, a voltage of the tube, a pixel size of the detector and a noise of the detector. The imaging geometry can also be provided to the input device 101 in addition to geometry data and/or boundary data. Thus a virtual angiogram is created under conditions to meet as close as possible the imaging geometry of the clinical angiogram, in order to allow a good comparison between the virtual angiogram and the clinical angiogram. The imaging geometry may take into account e.g. a substantially identical projection angle for the virtual angiogram and the clinical angiogram and substantially the same image section 201 for the virtual angiogram and the clinical angiogram. In other words the geometric information for a generated vessel system 201 is compared to the vessel system, which is the basis for the clinical angiogram.

In order to test the correctness of the imaging geometry in an example a vessel segmentation for the both angiograms can be performed. The vessel segmentation generates a vessel contour for the clinical angiograms and the vessel contour for the virtual angiogram. The vessel contour of the virtual angiogram can be overlaid with the vessel contour of the clinical angiogram. If a discrepancy between the vessel contours of both angiograms occurs the user can be warned that the user may have chosen the wrong imaging geometry for the virtual angiography. The output device 193 can provide such a warning as a feedback to the user. By using this feedback a user can correct the input data which are the basis for the CFD simulation and thus for the vessel segmentation from the virtual angiogram. The warning can be provided in a percentage of probability or a degree of matching of both contours.

In another example the choosing of imaging geometry can be conducted by the processing device in a closed loop configuration or by a regulating circuit. Such a configuration may allow for an auto corrective system substantially without any interaction from a user who may not be a medical expert.

Assuming ideal conditions the virtual and clinical angiograms should be substantially identical for each point in space and time, due to the substantially identical imaging geometry. It may be desired in a real environment to reach these ideal conditions as close as possible.

Thus in a real environment a reliability value or error value may be provided which is an indication for the degree of how the virtual angiogram matches the clinical angiogram.

In an example this matching may not only be conducted for the locations at a single point of time but also for different points in time. An angiogram may be a sequence of images which depend on time. Thus at every time step a plurality of locations in the virtual angiogram and the clinical angiogram can be compared. Thus, not only location based quality measures can be provided. In addition, a time dependent quality measure can be provided. Such a time domain test can be conducted for all the proposed quality measures or quantitative measures such as L2 and L∞. Thus a time and/or location dependent quality measure can be provided. The time domain test may be suggested for any of the quality measures in order to determine the level of similarity between the virtual angiogram and the clinical angiogram for a certain time. A plurality of different points in time may provide a plurality of reference points comparable to the characteristic locations. In an example, the more reference points in space and/or in time in the virtual angiogram match the clinical angiogram the more the virtual angiogram matches the clinical angiogram. Thus, a time domain test may not be neglected compared to a space domain test.

Consequently the quality measure can be derived from at least one test selected from the group of tests consisting of a comparison of a cross sectional time intensity curve (TIC) from the clinical image data and the virtual image data, a comparison of a regional TIC from the clinical image data and the virtual image data, i.e. a region of interest time intensity curve (ROI TIC) from the clinical image data and the virtual image data, and a comparison of a streamline TIC from the clinical image data and the virtual image data. These tests may take into account the time and/or space and thus may deliver a time domain measure and/or a spatial domain measure. In addition to or alternatively to the tests based on a TIC a vortex test or an inflow jet test may be used. The vortex test may comprise comparing a vortex axis of the clinical angiogram and the virtual angiogram. The inflow jet test may compare the length of an inflow and/or the speed of an inflow. Furthermore a maximum intensity image for the inflow may be used for comparing the length of inflow.

In a real environment the quality measure may depend on the time and a discrepancy in time may occur at an outflow phase of a contrast agent. In other words, the quality measure and the quality of matching may decrease when the time increases. In the spatial domain, the space domain or the location domain at a predefined point in time for a correspondence check may substantially only characteristic locations of the vasculature be tested. The plurality of characteristic locations are spatially separated from another. Thus the number of the plurality of characteristic locations may be reduced by selecting characteristic locations. Such a selection can reduce a computational load. Examples for characteristic locations which may be selected from a plurality of locations in an angiogram could be the location behind the catheter, the location in front of the catheter, the location before or in front of each bifurcation and pathologies like the location at an aneurysm or the location at a stenosis. The characteristic locations can automatically be determined by an automatic vessel topology analysis. For example, rules for pattern detection could be used in an angiogram in order to identify characteristic locations. These rules of pattern detection may consider typical shapes of an aneurysm and/or a stenosis in an angiogram.

In the following some characteristic locations are described in more detail.

Figure 3:
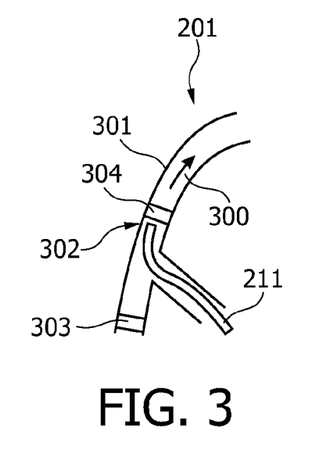
FIG. 3 shows a section of a vasculature comprising cross sectional TICs at a catheter according to an exemplary embodiment of the present invention.

One example of a characteristic location is the location behind the catheter. FIG. 3 shows the characteristic position "behind catheter" in relation to a catheter location according to an exemplary embodiment of the present invention. In the CFD simulation a bolus propagation is simulated from the injection point down to the capillary bed. The capillary bed is an area comprising a plurality of bifurcations not shown in FIG. 3. The down or fluid flow direction in FIG. 3 is shown by arrow 300 and indicates the direction of a liquid flow in tube 301 or vessel 301 of vasculature 201. The injection point 302 is an area at the end of catheter 211. Since CFD simulates the propagation from the injection point 302 in direction to the capillary bed a contrast agent propagation upstream, i.e. in the opposite direction to the downstream 300, may substantially not be incorporated in the CFD simulation. The backflow could be determined at a characteristic location 303 if a backflow would be incorporated in the CFD simulation. Backflow may not be taken into account when using a mixing model, because a backflow could make the amount of contrast agent difficult to predict, which flows in the downstream direction. However, other models for CFD simulation besides the mixing model could take the backflow 303 into account.

In a clinical angiogram the backflow 303 can be checked or derived by performing an automatic catheter detection and by extracting a cross-sectional TIC 303 substantially directly behind the detected catheter 201. The backflow lies in an opposite direction to direction 300 regarded from the catheter 211. A cross-sectional TIC in FIG. 3 is shown at the backflow position 303 and at the injection position 304. An extracting point of a cross-sectional TIC 303, 304 in the figures is indicated by an equally shaded rectangular structure 303, 304 indicating the averaging effect over the cross section of vessel 301 at the corresponding characteristic location. Thus a single value for a cross-sectional TIC may be provided.

In the case of a backflow, the cross-sectional TIC 303 delivers or consists of values which are above zero. However, the image analyzing apparatus according to the invention informs a user that the corresponding CFD simulation at backflow position 303 is not valid. This invalidity of results is indicated by setting the quality measure of the backflow to zero even if it is clearly above zero as shown in the backflow measure table 227 of FIG. 2. As a solution for minimizing such an error source the analyzing apparatus may suggest a reduction of an injection rate for the clinical angiogram which reduction of the injection rate could substantially prevent a backflow.

Another example for a characteristic location in an angiogram can be the characteristic location 'at catheter tip'. After analyzing the location 'behind catheter' 303 the position 'at catheter tip' 304 can be examined. Both values, the values for contrast agent (CA) distribution in a virtual angiogram and in a clinical angiogram can be different, at the location 'at catheter tip' 304 if the injection curves used in each of the angiogram differ. The identity of the contrast agent injection can be checked or compared for both angiograms at the position 'at catheter tip' 304. An injection curve in a simple case can be a step function and in a more complicated case could have any other form. Thus, if different injection curves are used for the both angiograms, the contrast agent distribution may differ at subsequent locations lying in a down direction in the vessel tree despite the fact that the CFD calculates the correct contrast agent propagation. The difference may occur since the tip of the catheter may move within the vessel 301 and thus makes the determination of the actual position for injecting the contrast agent difficult.

Thus, in order to check the identity of the CA distribution instead of a substantially exact tip position the cross-sectional TIC 304 at the catheter tip can be extracted in both angiograms. The location of such cross-sectional TIC 304 may be predictable with a high degree of accuracy in both, the virtual angiogram and the clinical angiogram. The cross-sectional TIC 304 in the virtual angiogram and in the corresponding cross-sectional TIC in the clinical angiogram can be compared. The employment of a cross-sectional TIC instead of a regional TIC allows exploiting an averaging effect and may provide a good predicable location for the contrast agent application. The catheter 211 may move randomly during the injection and thus may lead to streamlining In other words, streamlining may result in different laminar layers which are contrasted unequally. The use of cross-sectional TICs may prevent simulating of a randomly moving injection catheter tip in the CFD.

Since the effect of diffusion exists the effects of streamlining in a larger distance from the catheter then 'at the catheter tip' in a downstream direction may not have such a severe impact to the simulation result as the streamlining effect close at the location of injection at the catheter tip.

In an example an appropriate quality measure for comparing the cross-sectional TIC 304 in the clinical angiogram and the cross-sectional TIC 304 in the virtual angiogram at the catheter tip may be the L2 norm or the L∞. The L2 norm and/or L∞ norm may be a quality measure suitable for comparing two curves. Any other quality measure suitable for comparing two curves may also be used as an appropriate quality measure at the characteristic location 'at catheter tip'.

The processing device 102 may determine that the injection curves 304 of the clinical angiogram and of the virtual angiogram diverge above a specifiable error margin. In such a case the virtual angiogram may be rejected or the processing device 102 indicates a possible error source for such an inaccuracy. The specifiable error margin may be selected such, that the specified error margin at the position for location close to the injection point 304 is more strict than in a subsequent point or location which lies in a larger distance in downstream direction 300 from the injection point 304. Substantially all numerical or other CFD inaccuracies may be accumulated along the vessel 301 and thus make the requirements to the error margin in a far more downstream direction not as strict as the error margin close to an injection point.

A mixing model for CFD simulation and calculation for the injection curve may use at least one parameter selected from the group of parameters consisting of an injection rate over time, a flow or blood flow at an inlet and a vessel resistance as input parameters. At least one of these input parameters of the mixing model may lead to a TIC deviation. This information about the influence of the input parameter to the deviation can be used if different cross-sectional TICs between the virtual angiogram and the clinical angiogram are detected. In the case that different cross sectional TICs are detected the imaging analyzing apparatus 100 or the analyzing system 100 can advise the user to check at least one of these input parameters or input data. Using this information, allows the system to provide a hint to a possible error source to a user by detecting a difference in both angiograms.

An exclusion scheme can be used by the system for identifying the inaccurate input. The steps of the exclusion scheme or the exclusion method may be executed by the processing device 102 in order to identify an inaccurate input datum in case of TIC deviation.

The exclusion method comprises the step of detecting whether the maxima of both TICs differ. In case that substantially only the maxima of both TICs differ with a high reliability an incorrect assumption of the contrast agent amount can be concluded, In another example the exclusion method comprises a step of detecting steepness of the flanks of a TIC. Should the steepness of the flanks of a TIC differ between the virtual angiogram and the clinical angiogram as a possible error source the processing device 102 may provide an indication that with a high probability the shape of the injection curve may be incorrect.

In another example the exclusion method comprises a step of determining the degree of pulsatility inaccuracy. If the degree of pulsatility is determined as being inaccurate, with a high probability a wrong assumption of the blood flow and/or a wrong assumption of the value for the resistance can be identified as a possible error source. The vessel resistance and/or the assumed blood flow may determine a mixing factor between the contrast agent and blood.

If the injection rate over time is identified as a possible error source or as the only error source and the blood flow and vessel resistances can be substantially excluded to be the error source, the system 100 can propose extracting the injection curve from the image data itself and not from the parameters of the injecting device. Thus, the parameters assumed to model the injecting device are not assumed to be trustable. In cases where the injection rate over time cannot be identified as the substantially only error source, the system may not propose extracting the injection curve from the image data itself since wrong assumptions could be made for a subsequent bolus propagation and thus leading to divergences at vessel locations in a downstream direction laying in a larger distance from the injection location 304.

Yet another characteristic location can be the location 'before bifurcations' or the location in front of bifurcations, seen in a downstream direction from an injection location 304.

Figure 4:
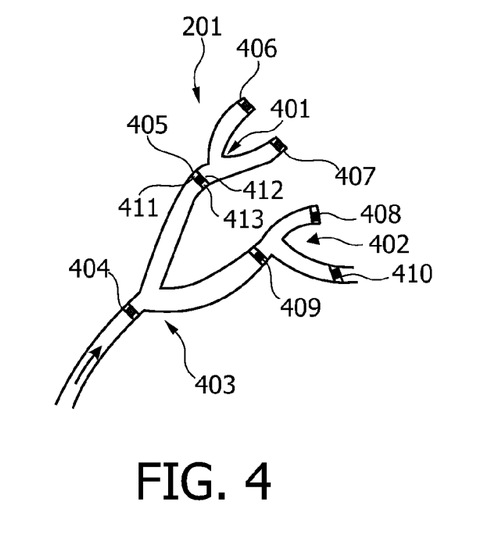
FIG. 4 shows a section of a vasculature comprising streamline TICs at bifurcations according to an exemplary embodiment of the present invention.

In elongated vessel structures, as an error source for CFD simulations the inaccurate overall flow, the diffusion coefficient and/or the velocity profile over the vessel cross-section may be identified. These main error sources can become more prominent the longer the distance is over which the contrast agent can travel undisturbed in the vessel. This physical effect makes a test location situated close before a bifurcation a suitable characteristic test location. FIG. 4 shows a section of a vasculature 201 with three bifurcations 401, 402, 403 according to an exemplary embodiment of the present invention. FIG. 4 furthermore shows seven characteristic positions 'before bifurcations' 404, 405, 406, 407, 408, 409, 410. A streamline TIC 404, 405, 406, 407, 408, 409, 410 can be an appropriate quality measure for the locations 'before bifurcation'. A streamline TIC 404, 405, 406, 407, 408, 409, 410 thus can be used as the quantitative measure for comparing the clinical angiogram and the virtual angiogram around characteristic locations at bifurcations.

A streamline TIC 404, 405, 406, 407, 408, 409, 410 may comprise a plurality of TICs of compartments 411, 412, 413. These TICs of compartments are obtained when a vessel cross-section is divided into compartments or blocks. TICs comprising three compartments are shown in FIG. 4 at the locations 'before bifurcations' 404, 405, 406, 407, 408, 410, 409. For example, the streamline TIC at the second characteristic position 405 comprises a first compartment 411 on a left position, a second compartment 412 in a middle position and a third compartment 413 at a right position seen in a flow direction. The middle position 412 is embedded in the left compartment 411 and the right compartment 413. The middle TIC 412 or center TIC 412 substantially provides information about a propagation speed in the corresponding vessel. Thus the centerline TIC can be used as a source of information about the correctness of the assumed overall flow rate. In order to use the centerline as an indicator for the overall flow rate the time distance of a leading flank can be used. The time distance of the leading flank may be the time difference of bolus arrival, measured for example as the uptake of flank, the leading half flank etc. In other words, measuring the time of CA application and the detection of a leading flank in the centerline TIC may allow the determination of a propagation speed of the fluid and/or may allow the verification of the correctness of the assumed overall flow rate. The time distance may be determined by determining the bolus arrival time in both, the clinical angiogram and the virtual angiogram. The reliability of a simulation may be high if the bolus arrival time in both angiograms substantially match.

The outer stream line TICs 411, 413, i.e. the left TIC 411 and the right TIC 413, can provide information about the diffusion coefficient and the cross-sectional velocity profile. For comparing the clinical angiogram and the virtual angiogram the steepness of the leading flank can be used as well as the degree of pulsatility. A high diffusion or a high difference in the cross-sectional velocity profile may result in less pulsatility and in a flat increasing flank.

The separating of a cross-section into a plurality of compartments may provide a higher granularity of quality measure. Each compartment or block may provide an individual quality measure for the corresponding stream line. However as a general quality measure for each streamline 411, 412, 413 at characteristic locations 'bifurcations' 404, 405, 406, 407, 408, 409, 410 the L2 and the L∞ norm or any other quality measure suitable for comparison of two curves can be used. If the location before the bifurcation fails the check only the CFD simulation results up to the last bifurcation are labeled as trustworthy as long as no other pathology is detected. In other words, if two characteristic locations are identified as characteristic locations 'before bifurcation', e.g. locations 404 and 405 in FIG. 4 and if one characteristic location, e.g. the location at 405 show a high difference between clinical angiogram data and virtual angiogram data, only the result of CFD ahead the first characteristic position 'before bifurcations' 404 is labeled as trustworthy whereas the region between 404 and 405 is labeled as not reliable. Information about the most likely reason for the difference of virtual and clinical angiograms can be provided to the user as an indication to a possible error source. An example for a possible error source may be a wrong flow ratio, i.e. the part of a flow going into one branch of a bifurcation may base on wrong assumptions.

Secondary flow patterns of bifurcation, e.g. turbulences, can be tested in a similar manner as the flow patterns for an aneurysm are examined. For examining aneurysms regions of interest (ROIs) are defined. However, since a cross-section of a vessel can be very small in a case where the vessel is examined the definition of regions of interest in such small vessel structures might lead to fine patterns which substantially only can be visualized with high quality detectors having reduced noise, high spatial resolution and small physical dimensions in order to fit into small vessel structures.

Figure 5:
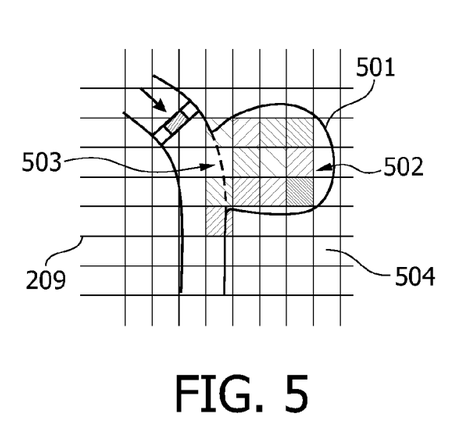
FIG. 5 shows a section of a vasculature comprising a region of interest TIC extraction at an aneurysm according to an exemplary embodiment of the present invention.

FIG. 5 shows a region of interest TIC extraction for a characteristic location 'at aneurysm' according to an exemplary embodiment of the present invention. FIG. 5 shows testing of flow patterns in an aneurysm.

In a vessel structure, which has a more irregular geometric shape than the shape of a tube or a vessel, a high diversity of flow patterns can exist. Since there are a high number of possible flow patterns a more elaborated test may provide good results for such irregular geometric shapes. For providing a more detailed analysis of a substantially irregular structure, such as an aneurysm, the structure is divided into regions of interest (ROI) by placing a regular grid 200 over the structure. In the example of FIG. 5, the aneurysm 501 has a form of a balloon. The grid 209 covers the aneurysm dome 502 as well as the aneurysm neck 503.

The grid 209 comprises the plurality of grid blocks 504. Each grid block 504 that is at least covered half by the aneurysm 501 is used to extract a region of interest time intensity curve (ROI TIC). Each block has its own TIC and/or quantitative measure. For example, dependent on the degree of diffusion at the corresponding grid block, each block corresponds to a different value or quality measure. These different values are indicated by grids in different colors or shades in FIG. 5. These different quantitative values make the blocks and/or ROIs comparable. A region of interest TIC may also be named as the TIC of a block. The grid resolution or the block size may depend on the spatial resolution of the detector which may be used to determine the clinical angiogram, on the detector noise and/or on the degree of streamlining. The grid resolution on the other hand may also depend on the expected granularity of the flow pattern. The expected granularity of the flow pattern and the spatial resolution of the detector, the detector noise and the degree of streamlining could be determined in the processing device 102. Furthermore the block size also depends on the structure size itself. For example, after detecting the dimensions of a structure such as an aneurysm the granularity of the grid resolution is selected such, that a predefined number of blocks is covered by the structure. In the example of FIG. 5, the block size is selected such that at least 9 blocks cover the aneurysm dome 502. Thus 9 ROIs may be identified in the dome 502. Further blocks may substantially cover the neck 503. Selecting the granularity of the grid may be a trade-off between an expected averaging effect and the spatial resolution of the flow pattern. The averaging effect can be used to suppress an interference factor and/or to suppress the spatial resolution of the flow pattern. Corresponding ROI TICs in the clinical angiogram and the virtual angiogram can be compared with regard to the quantitative qualities like bolus arrival time, degree of pulsatility, L2 and/or L∞ norm of TIC. In other words, for comparing the corresponding ROIs in the clinical angiogram and the virtual angiogram the quantitative values are calculated which express a probability of trustability in the form of a quantitative matching factor.

In addition, structure specific measures can be applied to aneurysms. This application of structure specific measures can comprise the extraction of the vortex axis, the rotation speed of the vortex, the local resistance time of contrast agent, the length, the angle of an inflow jet, the speed of an inflow jet and/or the contrast agent exchange between the compartments 504, i.e. the ROIs or blocks and/or the local transfer functions for each compartment 504. A vortex axis can be compared by comparing the angle of the vortex axis. The local residence time of contrast agent may be determined by the time difference between a contrast agent uptake and outflow for each of the above defined compartments. The local transfer function for each compartment can be obtained by deconvolution with the inflow TIC of an aneurysm. Since the local transfer function for each compartment is calculated by deconvolution of functions which are independent of the injection the measure which results from the local transfer function may be substantially independent of the injection. In other words, the TIC of a block may be obtained by convoluting the inflow TIC with the pulse response of a compartment in the time domain. Thus, in the spatial domain the inflow TIC is multiplied by the transfer function of each compartment. This allows calculating the transfer function and transforming the result back into the time domain.

Figure 6:
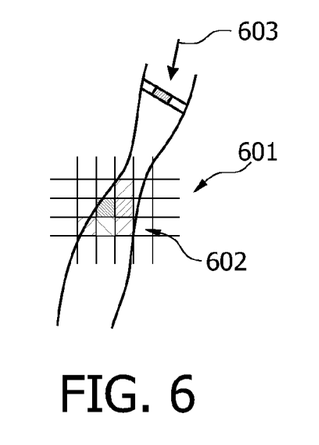
FIG. 6 shows a section of a vasculature comprising a region of interest TIC extraction at a stenosis according to an exemplary embodiment of the present invention.

FIG. 6 shows a further characteristic location which is given the name 'at stenosis' 601 and is located at an elected stenosis. For stenosis 601 an ROI TIC 602 is similarly used as the ROI TIC of the aneurysm 501. The ROI TIC 602 is used for a quantitative comparison mean for comparing the degree of matching between the clinical angiogram data and the virtual angiogram data. The ROI TICs 602 may be selected such, that substantially the region in a flow direction 603 behind the stenosis 601 is covered for comparing the clinical angiogram and the virtual angiogram. The location behind the stenosis may be an interesting region since turbulences substantially occur behind the stenosis. A stenosis narrows a vessel cross section.

The imaging analyzing apparatus 100 can be implemented as a CFD workstation.

Figure 7:
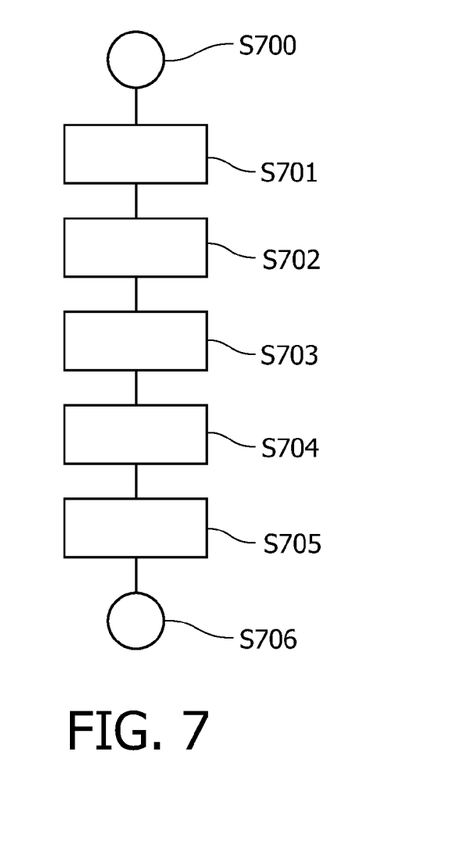
FIG. 7 shows a flow diagram for a method for analyzing an image according to an exemplary embodiment of the present invention.

FIG. 7 shows a flow diagram for a method for analyzing an image according to an exemplary embodiment of the present invention. The method starts in an idle state S700 and after initializing in step S700, in step S701 clinical image data, boundary data and/or geometric data are received. In step S702 flow pattern data is generated from the geometric data and/or from the boundary data.

In step S703 from the generated flow pattern data a virtual image data or virtual angiogram data are generated.

In step S704 a plurality of characteristic locations is determined in the clinical image data and in the virtual image data and a quality measure at each of the plurality of characteristic locations is provided. The quality measure can be a single quantitative measure or a list of quantitative measures representing the degree of the clinical image data matching the virtual image data at each characteristic location The quality measure thus indicates the quality of correspondence of the clinical angiogram data and the virtual angiogram data at each of the plurality of characteristic locations. In an example the processing device 102 can select the appropriate locations and/or the appropriate quantitative measures.

The quantitative measure may be used internally in the imaging analyzing apparatus 100 or may be displayed in an optional additional step S 705, e.g. as a color coded measure. Step S705 may also comprise determining a single quantitative value representative for a list of values 208.

In step S706 the method ends in the idle state. The steps S700-S706 could be repeated in particular to reach a good quality measure at the predefined characteristic location of the plurality of characteristic locations. The quality may be increased by repeatedly conducting a simulation and determine the corresponding quality measure. A good quality measure may be reached if a minimal value for error probability for different simulations with different input parameters can be provided.

Using an injection model for calculating the CFD simulation may assist a physician and may prevent a direct interaction with a patient's body. Furthermore, the present invention may be employed for analyzing flow patterns on a silicon phantom. The present invention may provide quality measures for simulation results which may be used in all technical fields of simulation of a physical structure.

A flow pattern in a tube system is calculated from acquired image data. From the flow pattern virtual image data are generated and compared with the acquired data in order to obtain a quality measure for the usability of the generated flow pattern at characteristic locations.

The term angiogram data may be used as a name for different types of image data, in particular for a time sequence of image data. Angiogram data may be a time dependent data sequence, an image sequence and a digital image representation.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutual different dependent claims does not indicate that a combination of these measures cannot be used to advantage.

A computer program may be stored and/or distributed on a suitable medium such as an optical storage medium or a solid state medium supplied together or as part of other hardware, but may also be distributed in other forms, such as via the Internet or other wired or wireless telecommunication systems.

The invention claimed is:

1. An imaging analyzing apparatus, comprising an input device, a processing device, and an output device; wherein the input device is configured for receiving input data in form of clinical image data, geometric data, and boundary data; wherein the processing device is configured for generating flow pattern data from the geometric data and from the boundary data; wherein the processing device is configured for generating virtual image data from the generated flow pattern data; wherein the processing device is configured, to compare the clinical image data and the virtual image data, for determining a plurality of characteristic locations in the clinical image data and, in the virtual image data, the same characteristic locations; wherein the output device is configured for providing, for multiple different ones of said same characteristic locations, respective quality measures which are outputs of respective quality-measuring algorithms and which indicate the quality of correspondence between the clinical image data and the virtual image data, wherein said multiple characteristic locations are classifiable into respective characteristic location types;

wherein, for a characteristic location from among said multiple characteristic locations, an algorithm from among a set of one or more of said algorithms is applied in said providing, said set varying with the type of said characteristic location; and wherein the applying entails referring to a pre-existing table that links said type correspondingly to said set and is usable in selecting said algorithm.

2. The imaging analyzing apparatus of claim 1, wherein at least one of the geometric data and the boundary data comprise at least one datum selected from the group of data consisting of: a vasculature geometry; geometric data corresponding to the clinical image data; an injection rate; a vessel resistance; an input flow; an output flow; an output flow at a plurality of outlets; an input pressure; an output pressure; an input velocity; an output velocity; a velocity over a cross section; an upstream vessel pressure; and a downstream vessel pressure.

3. The apparatus of claim 2, one or more of said at least one datum being the injection rate.

4. The apparatus of claim 3, said injection rate comprising an injection rate over time.

5. The imaging analyzing apparatus of claim 1, wherein a quality measure from among said quality measures is derived from at least one test selected from the group of tests consisting of: a comparison of a cross sectional time intensity curve from the clinical image data and the virtual image data; a comparison of a regional time intensity curve from the clinical image data and the virtual image data; and a comparison of a streamline time intensity curve from the clinical image data and the virtual image data.

6. The imaging analyzing apparatus of claim 1, wherein a quality measure from among said quality measures is at least one quality measure selected from the group of quality measures consisting of: a quantitative measure for the correspondence of the virtual angiogram data and the clinical angiogram data; a time domain measure; a confidence measure for the flow pattern data; an Lp norm of cross-sectional time intensity curve an L2 norm of cross-sectional time intensity curve; an L∞ norm of cross-sectional time intensity curve; an Lp norm of cross-sectional time intensity curve; an L2 norm of streamline time intensity curve; an L∞ norm of streamline time intensity curve; an Lp norm of region of interest time intensity curve; an L2 norm of region of interest time intensity curve; an L∞ norm of region of interest time intensity curve; a steepness of increasing flank; a degree of pulsatility; a degree of backflow; a temporal distance; a spatial domain measure; a vortex axis; a rotation speed of vortex; a length of an inflow jet; an angle of an inflow jet; a speed of an inflow jet; a contrast agent exchange between compartments; a local transfer function; and a color coded measure for the correspondence of the virtual angiogram data and the clinical angiogram data.

7. The apparatus of claim 6, said quality measure being a time domain measure.

8. The apparatus of claim 6, said quality measure being a confidence measure for the flow pattern data.

9. The imaging analyzing apparatus of claim 1, wherein the output device is configured to provide a quality measure from among said quality measures in at least one display mode selected from the group of display modes consisting of: displaying a single quantitative measure; displaying a single quantitative measure representative for a list of measures; and displaying a color coded degree of reliability.

10. The apparatus of claim 1, wherein the output device is further configured for providing at least one feedback selected from the group of feedbacks consisting of: making a suggestion that is dependent on the type of the characteristic location as to an appropriate quality measure; making a suggestion that is dependent on the type of the characteristic location as to an appropriate group of quality measures; and providing a possible source for an inaccuracy of input data for generating the flow pattern.

11. The apparatus of claim 10, said at least one feedback being selected from a subgroup consisting of: making a suggestion that is dependent on the type of the characteristic location as to an appropriate quality measure; making a suggestion that is dependent on the type of the characteristic location as to an appropriate group of quality measures.

12. The imaging analyzing apparatus of claim 10, said output device being further configured for providing at least one feedback selected from the subgroup of said feedbacks consisting of: the suggesting of said appropriate quality measure; and the suggesting of said appropriate group of quality measures.

13. The image analyzing apparatus of claim 12, wherein the input device comprises at least one device selected from the group of devices consisting of: an injection device; an X-ray device; a CT device; a magneto resonance imaging device; an ultrasound device; a sonar device; a pressure measure device; an electromagnetic flow meter; and a Doppler ultrasound device, said processing device comprising, for said determining, a data processing unit, said apparatus further including an image representation device serving as an output interface for output generated by said output device.

14. The apparatus of claim 1, wherein said output device selects, based on type of characteristic location, said quality measures to be provided in said providing, and wherein the selecting selects, based on said type of characteristic location, between different kinds of time intensity curves.

15. The apparatus of claim 14, wherein candidates for the selecting between different kinds of time intensity curves include cross-sectional, streamline, and region of interest (ROI) time intensity curves.

16. The apparatus of claim 1, wherein said clinical image data is clinical image data of a given patient, said type being a classification more general than any particular body location of said patient.

17. The apparatus of claim 1, wherein the output device is further configured for deciding whether a quality measure, from among said quality measures, matches a predefined quality measure and for, if the decision is that said quality measure does not match said predefined quality measure or come within a range of acceptable quality measures, generating a further flow pattern.

18. An imaging analyzing apparatus, comprising an input device, a processing device, and an output device; wherein the input device is configured for receiving input data in form of clinical image data, geometric data, and boundary data; wherein the processing device is configured for generating flow pattern data from the geometric data and from the boundary data; wherein the processing device is configured for generating virtual image data from the generated flow pattern data; wherein the processing device is configured for determining, to compare the clinical image data to the virtual image data, a plurality of characteristic locations in the clinical image data and, in the virtual image data, the same characteristic locations; wherein the output device is configured for providing, for multiple different ones of said same characteristic locations, respective quality measures which are outputs of respective quality-measuring algorithms and which indicate quality of correspondence between the clinical image data and the virtual image data;
  wherein said multiple characteristic locations are classifiable into respective characteristic location types;
  wherein said providing entails selecting a quality-measuring algorithm, from among a set of one or more of said quality-measuring algorithms, said set varying with characteristic location type; and
  wherein said selecting entails referring to a pre-existing table that links, to said characteristic location type, a quality-measuring algorithm from among said set.

19. The apparatus of claim 18, said processing device being configured to determine a characteristic location from among said multiple characteristic locations according to the predetermined automatic pattern recognition criterion.

20. The apparatus of claim 18, wherein the processing device is farther configured to identify individually at least one characteristic location from among said plurality of characteristic locations according to a predefined determination criterion selected from the group of determination criteria consisting of: a location behind a catheter; a location at a catheter tip; a location at a pathology; a location behind a bifurcation; a location before a bifurcation; a location at an aneurysm; a location at a stenosis; and a location of an outflow.

21. The imaging analyzing apparatus of claim 18, wherein the input device comprises at least one device selected from the group of devices consisting of: an injection device; an X-ray device; a CT device; a magneto resonance imaging device; an ultrasound device; a sonar device; a pressure measure device; an electromagnetic flow meter; and a Doppler ultrasound device, said processing device comprising, for said determining, a data processing unit, said apparatus further including an image representation device serving as an output interface for output generated by said output device.

22. The imaging analyzing apparatus of claim 21, wherein the input device is configured for executing at least one preprocessing method selected from the group of preprocessing methods consisting of: extracting boundary data from the input device directly; forwarding raw input data to the processing device; converting raw input data to adequate input data for the processing device; calculating input data for the processing device based on assumptions; and converting raw input data and assumption based input data into adequate input data for the processing device.

23. The apparatus of claim 18, wherein ones from among said respective characteristic location types differ from each other as to fluid flow pattern.

24. The apparatus of claim 18, wherein said output device is configured for making multiple suggestions as to quality measure that are correspondingly dependent on ones from among said respective characteristic location types, wherein what is appropriate in said suggesting varies by type of characteristic location.

25. An imaging analyzing apparatus, comprising an input device, a processing device, and an output device: wherein the input device is configured for receiving input data in form of clinical image data, geometric data, and boundary data; wherein the processing device is configured for generating flow pattern data from the geometric data and from the boundary data; wherein the processing device is configured for generating virtual image data from the generated flow pattern data; wherein the processing device is configured, to compare the clinical image data with the virtual image data, for determining a plurality of characteristic locations in the clinical image data that are classifiable into respective characteristic location types and, in the virtual image data, the same characteristic locations; wherein the output device is configured for providing, for multiple different ones of said same characteristic locations, quality measures which are outputs of respective quality-measuring algorithms and which indicate quality of correspondence between the clinical image data and the virtual image data, wherein the output device is configured for suggesting, for a characteristic location from among said multiple characteristic locations, an appropriate quality measure;
  wherein what is appropriate in said suggesting varies type of characteristic location.

26. The imaging analyzing apparatus of claim 25, wherein the output device is configured for comparing a vessel segmentation for the clinical image data and vessel segmentation for the virtual image data.

27. The imaging analyzing apparatus of claim 25, wherein the input device comprises at least one device selected from the group of devices consisting of: an injection device; an X-ray device; a CT device; a magneto resonance imaging device; an ultrasound device; a sonar device; a pressure measure device; an electromagnetic flow meter; and a Doppler ultrasound device.

28. The apparatus of claim 27, said input device comprising an injection device.

29. The apparatus of claim 27, said processing device comprising, for said determining, a data processing unit, said apparatus further including an image representation device serving as an output interface for output generated by said output device.

30. The apparatus of claim 25, said generating of said flow pattern data including performing computational fluid dynamics and using output of said performing such that the generated flow pattern data reflects said output.

31. The apparatus of claim 25, said generating of said virtual image data comprising performing a computational fluid dynamics (CFD) simulation and using output of said simulation.

32. The apparatus of claim 31, said simulation comprising a bolus injection simulation.

33. The apparatus of claim 25, wherein said output device is configured for, in said suggesting, making multiple suggestions that are correspondingly dependent on ones from among said respective characteristic location types, wherein what is appropriate in said suggesting varies by type of characteristic location.

34. The apparatus of claim 25, wherein ones from among said respective characteristic location types differ from each other as to fluid flow pattern.

* * * * *